(12) United States Patent
Wu

(10) Patent No.: US 7,590,301 B2
(45) Date of Patent: Sep. 15, 2009

(54) METHOD AND SYSTEM FOR CORRECTING DEFECTIVE PIXELS OF A COLOR IMAGE

(75) Inventor: Cheng-Yu Wu, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 696 days.

(21) Appl. No.: 11/345,308

(22) Filed: Feb. 2, 2006

(65) Prior Publication Data

US 2007/0009172 A1    Jan. 11, 2007

(30) Foreign Application Priority Data

Jul. 7, 2005    (TW) .............................. 94123004 A

(51) Int. Cl.
*G06K 9/40* (2006.01)
*H04N 9/64* (2006.01)

(52) U.S. Cl. .................... 382/262; 382/274; 348/246

(58) Field of Classification Search ................ 382/262, 382/260, 254, 266, 300, 162, 167, 274; 348/247, 348/220.1, 246, 241, 252
See application file for complete search history.

(56) References Cited

U.S. PATENT DOCUMENTS

| 6,741,754 | B2 | 5/2004 | Hamilton, Jr. ............... 382/275 |
| 6,819,359 | B1 * | 11/2004 | Oda ........................... 348/247 |
| 2004/0119856 | A1 | 6/2004 | Nishio et al. ................. 348/246 |

* cited by examiner

*Primary Examiner*—Yon Couso
(74) *Attorney, Agent, or Firm*—Bacon & Thomas PLLC

(57) ABSTRACT

A method and system for correcting defective pixels of a color image, which first performs an interpolation on a Bayer image captured by an image sensor to thus reconstruct red, green and blue (RGB) colors corresponding to each pixel and obtain an RGB image, then converts the RGB image from the RGB domain to a chroma domain, and finally uses neighboring pixel values to correct a respective defective pixel. Because a defective pixel can be distinct from the chroma domain easier than the RGB domain, it can accurately determine whether or not a pixel to be processed is defective.

16 Claims, 6 Drawing Sheets

METHOD AND SYSTEM FOR CORRECTING DEFECTIVE PIXELS OF A COLOR IMAGE

BACKGROUND OF THE INVENTION

1. Field of the Invention

The invention relates to the technical field of image processing and, more particularly, to a method and system for correcting defective pixels of a color image.

2. Description of Related Art

A color image processing system essentially includes an image capture unit, an image reconstructing and processing unit, an image display and an image compression unit. The image capture unit includes an image sensor, which is a sensitive device consisting of multiple photodiodes in a 2D array. The sensitive device converts an intensity of a sensed light into an electronic signal for the image reconstructing and processing unit in order to further perform the corresponding image processing. However, due to the unavoidable errors in process, the photodiodes causes faults in the image sensor. Namely, the image sensor has one or more defective pixels to cause inaccurate photosensitive conversion, so as to form dark dots or bright dots on an captured image.

To overcome this problem, the U.S. Pat. No. 6,741,754 granted to Hamilton, Jr. for a "Correcting for defects in a digital image taken by an image sensor caused by pre-existing defects in two pixels in adjacent columns of an image sensor" has taught that an electrical detection is performed directly on an image sensor to thus obtain the positions of the defective pixels and record the positions in a defect map. Accordingly, a defective pixel is corrected by the neighboring pixel values in accordance with the position of the defective pixel recorded in the defect map during the image processing. However, if the defect map is not updated immediately after the detection and recording, the defective pixels caused by the decaying photodiodes are not corrected.

To overcome this problem, US published application No. 2004/0119856 entitled "circuit and method for correction of defect pixel" has taught that a defective detection is performed real-time on a Bayer image to accordingly improve the disadvantage of using the defect map to record defective pixels. However, such a defective detection cannot find defective pixels on a Bayer image effectively because the inherent pixel crosstalk effect caused on an illuminated pixel.

Therefore, it is desirable to provide an improved method and system for correcting defective pixels of a color image to mitigate and/or obviate the aforementioned problems.

SUMMARY OF THE INVENTION

The object of the invention is to provide a method and system for correcting defective pixels of a color image, which can overcome the prior problems that the defective pixels caused by the decayed photodiodes are uncorrected and cannot be detected effectively on a Bayer image.

In accordance with one aspect of the present invention, there is provided a method for correcting defective pixels of a color image, which detects and corrects defective pixels of a digital image. The method includes the steps of: (A) receiving a pixel and its neighboring pixels of the digital image; (B) interpolating the pixel with red, green and blue colors; (C) producing a first chroma signal and a second chroma signal based on the red, green, blue colors of the pixel interpolated; (D) performing a filtering process on the first chroma signal and the second chroma signal to thus produce a third chroma signal and a fourth chroma signal; (E) determining the pixel as a defective pixel when the third chroma signal or fourth chroma signal is smaller than a threshold; (F) computing edge features of the pixel and neighboring pixels, and selecting pixel values from the neighboring pixels for a correction operation of the defective pixel in accordance with the edge features.

In accordance with another aspect of the present invention, there is provided a system for correcting defective pixels of a color image, which detects and corrects defective pixels of a digital image. The system includes an interpolator, a chroma generator, a defective pixel detector and a defective pixel corrector. The interpolator receives a pixel and its neighboring pixels of the digital image, and interpolates the pixel with red, green and blue colors. The chroma generator is connected to the interpolator in order to produce a first chroma signal and a second chroma signal based on the red, green and blue colors of the pixel interpolated. The defective pixel detector is connected to the chroma generator in order to filter the first chroma signal and the second chroma signal and produce a third chroma signal and a fourth chroma signal to thus produce a defective signal, which indicates the pixel received as a defective pixel, when the third chroma signal or fourth chroma signal is smaller than a threshold. The defective pixel corrector is connected to the defective pixel detector in order to compute edge features of the pixel and neighboring pixels in accordance with the defective signal, and select pixel values from the neighboring pixels for a correction of the defective pixel in accordance with the edge features.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
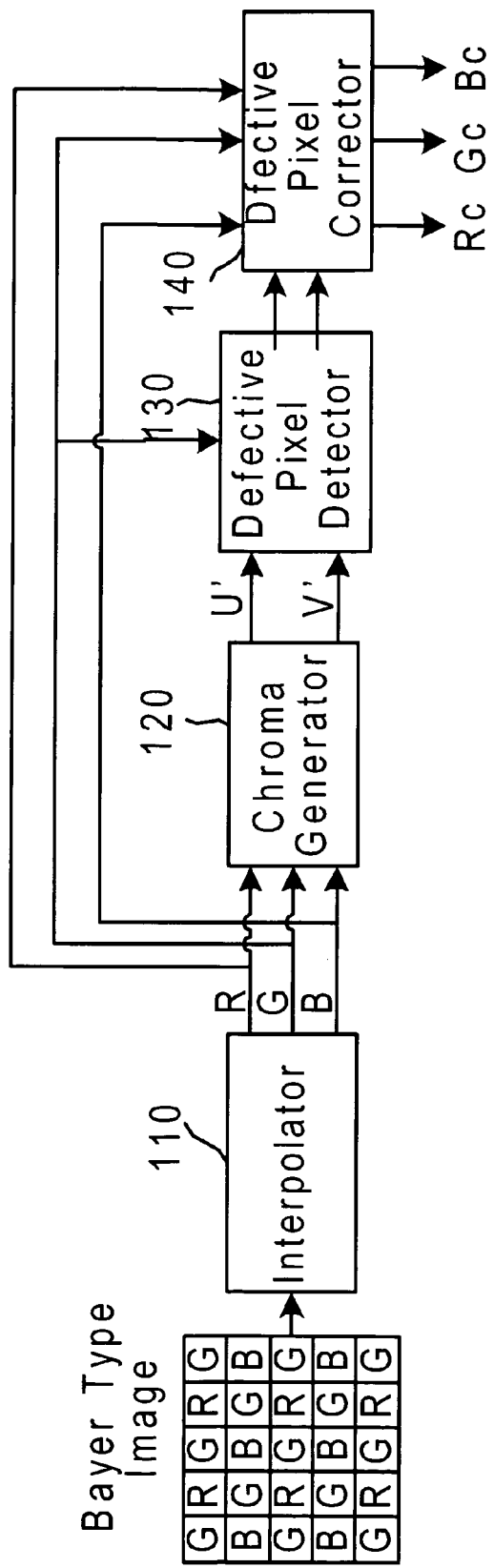
FIG. 1 is a block diagram of a system for correcting defective pixels of a color image in accordance with the invention.

FIG. 1 is a block diagram of a system for correcting defective pixels of a color image in accordance with the invention. The system detects and corrects defective pixels of a digital image. The digital image can be a Bayer type image. The system includes an interpolator 110, a chroma generator 120, a defective pixel detector 130 and a defective pixel corrector 140.

Figure 2:
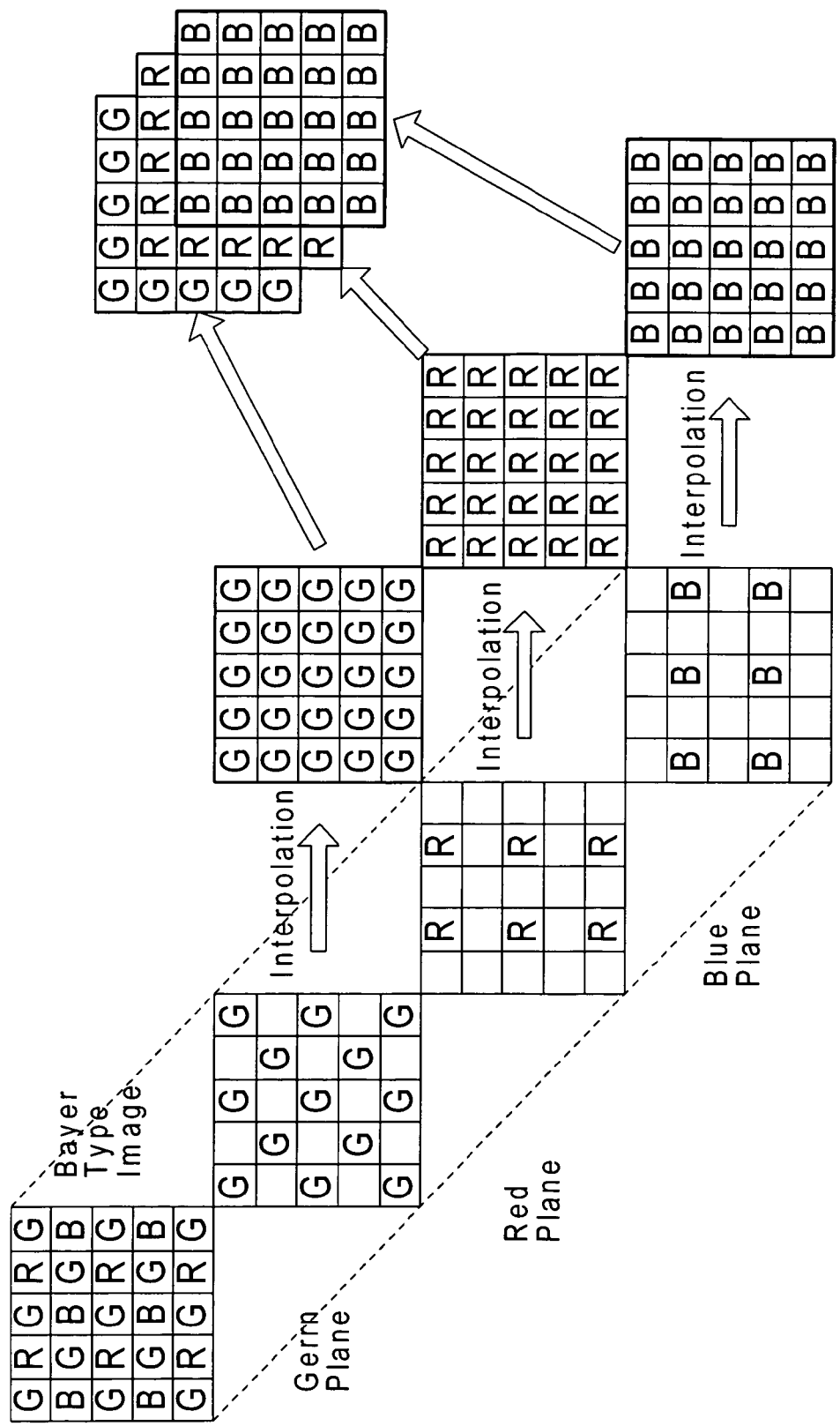
FIG. 2 is a schematic view of an interpolation of a Bayer image in accordance with the invention.

The interpolator 110 receives a pixel (i, j) and its neighboring pixels of the digital image and interpolates the pixel (i, j) with red, green and blue (RGB) colors. FIG. 2 is a schematic diagram of an interpolation of a Bayer image in accordance with the invention. As shown in FIG. 2, the pixels are arranged in a form of mutually interlaced GR-contained row and BG-contained row. Because each pixel of the Bayer type image contains only red, green or blue color, the interpolator 110 uses an interpolation to reconstruct missing colors for each pixel and accordingly outputs red, green and blue signals of the interpolated pixel (i, j).

Figure 3:
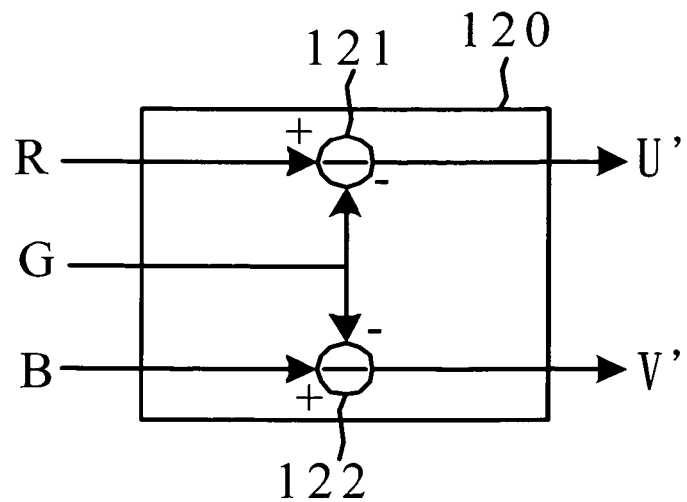
FIG. 3 is a circuit diagram of a chroma generator in accordance with the invention.

The chroma generator 120 is connected to the interpolator 110 in order to produce a first chroma signal U' and a second chroma signal V' in accordance with the red, green, blue colors of the pixel (i, j) interpolated. FIG. 3 is a circuit diagram of the chroma generator 120 in accordance with the invention. As shown in FIG. 3, the generator 120 includes a first subtractor 121 and a second subtractor 122. The first subtractor 121 has a first input terminal to receive the red signal and a second input terminal to receive the green signal, and subtracts the green signal from the red signal to thus generate the first chroma signal U'. The second subtractor 122 has a first input terminal to receive the blue signal and a second input terminal to receive the green signal, and subtracts the green signal from the blue signal to thus obtain the second chroma signal V'. Also, the neighboring pixels have the respective signals U', V'.

The defective pixel detector 130 is connected to the chroma generator 120 in order to filter the first chroma signal and the second chroma signal, thereby producing a third chroma signal U''' and a fourth chroma signal V'''. When the third chroma signal U''' or the fourth chroma signal V''' is smaller than a threshold, which indicates that the pixel (i, j) is a defective pixel, the detector 130 produces a defective signal.

Figure 4:
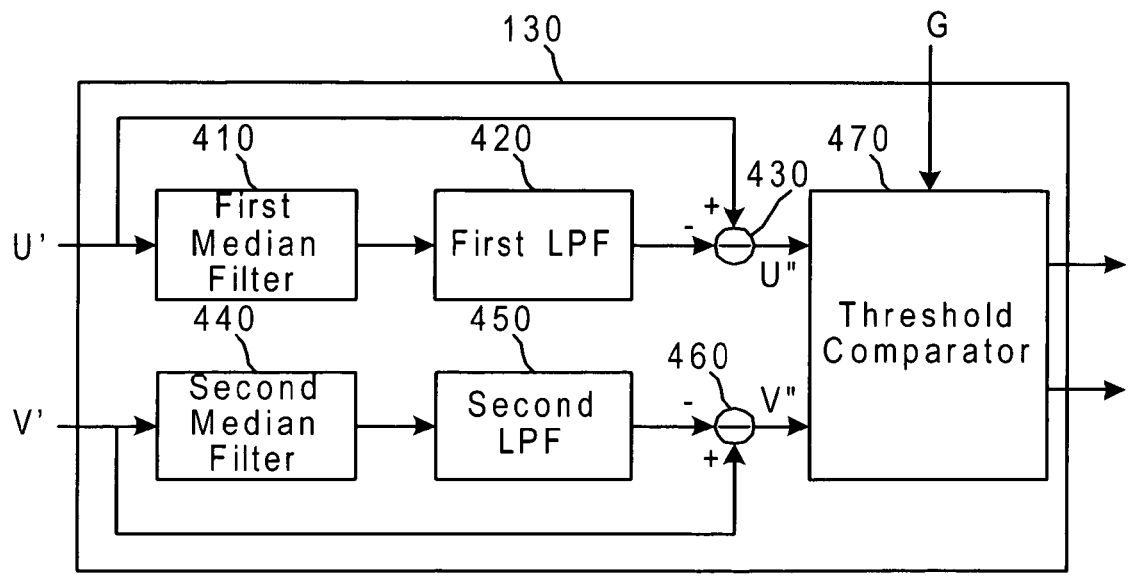
FIG. 4 is a block diagram of a defective pixel detector in accordance with the invention.

FIG. 4 is a block diagram of the defective pixel detector 130 in accordance with the invention. As shown in FIG. 4, the detector 130 includes a first median filter 410, a first low pass filter (LPF) 420, a third subtractor 430, a second median filter 440, a second LPF 450, a fourth subtractor 460 and a threshold comparator 470.

The first median filter 410 performs a median filtering process on the first chroma signal U', which arranges the first chroma signals U' of the pixel (i, j) and the neighboring pixels in an ascending sequence. For example, if the values of first chroma signals U' of the pixel (i, j) and the neighboring pixels are {135, 140, 163, 157, 160, 155, 150, 142, 140}, the first median filter 410 accordingly produces an ascending sequence, i.e., {135, 140, 140, 142, 150, 155, 157, 160, 163}.

The first LPF 420 is connected to the first median filter 410 in order to perform a low pass filtering process on the ascending sequence to thus produce a fifth chroma signal. The first LPF 420 can have a coefficient matrix, which is $$\begin{bmatrix} 0 & 0 & 1 \\ 4 & 6 & 4 \\ 1 & 0 & 0 \end{bmatrix} / 16.$$

Namely, after the first LPF 420 performs the low pass filtering process on the ascending sequence {135, 140, 140, 142, 150, 155, 157, 160, 163}, it produces the fifth chroma signal:

{140×1+142×4+150×6+155×4+157×1}/16.

The third subtractor 430 is connected to the first LPF 420 in order to subtract the fifth chroma signal from the first signal U' to thus produce the third chroma signal U'''.

Similarly, the second median filter 440 performs a median filtering process on the second chroma signal V'. The second LPF 450 is connected to the second median filter 440 in order to perform a low pass filtering process on a signal produced after the median filtering process, thereby producing a sixth chroma signal. The fourth subtractor 460 is connected to the second LPF 450 in order to subtract the sixth chroma signal from the second signal V' to thus produce the fourth chroma signal V'''.

Figure 5:
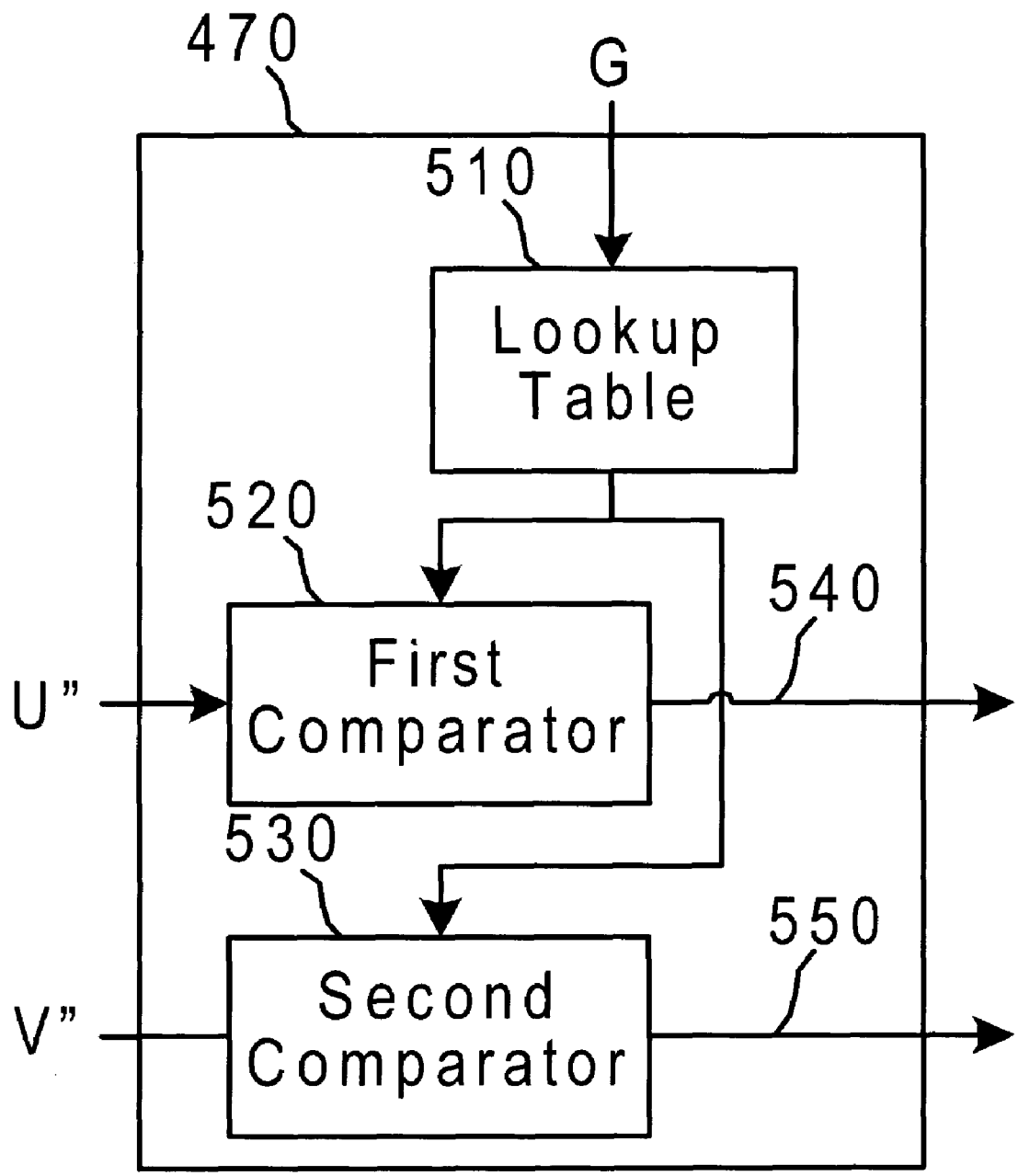
FIG. 5 is a block diagram of a threshold comparator in accordance with the invention.

The threshold comparator 470 is connected to the third subtractor 430 and the fourth subtractor 460 in order to produce a defective signal when the third chroma signal or the fourth chroma signal U''' or V''' is smaller than a threshold. FIG. 5 is a block diagram of the threshold comparator 470 in accordance with the invention. As shown in FIG. 5, the threshold comparator 470 includes a lookup table 510, a first comparator 520 and a second comparator 530.

Figure 6:
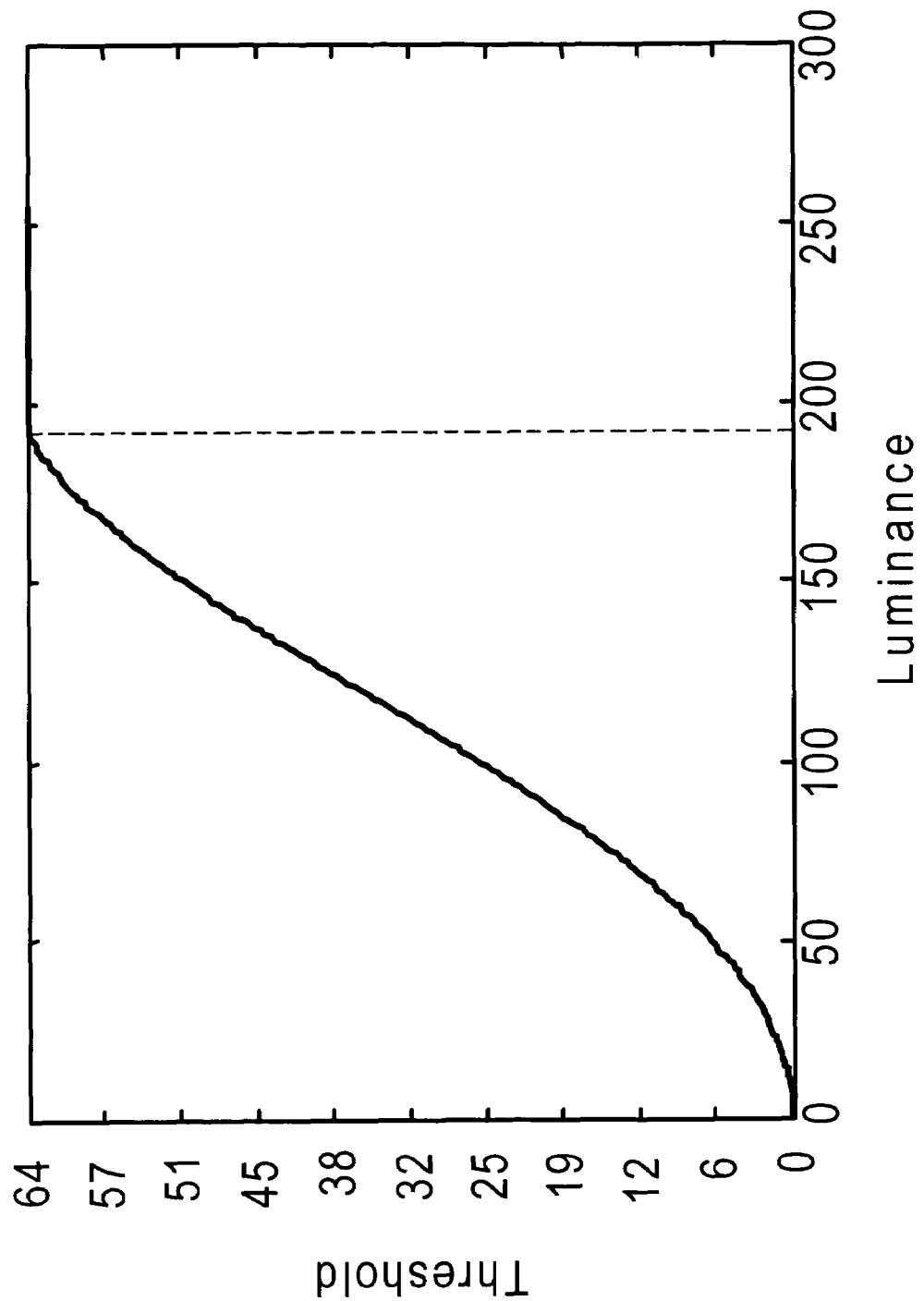
FIG. 6 is a schematic view of a threshold to luminance.

The lookup table 510, which is connected to the interpolator 110, produces the threshold in accordance with a value of the green signal of the pixel (i, j). An amount of the threshold is related to a luminance (green) of the pixel (i, j). FIG. 6 is a schematic view of threshold to luminance relationship. As shown in FIG. 6, the luminance increases with a great threshold and reduces with a small threshold. Namely, when a pixel is in a bright area, it needs a greater difference to determine whether the pixel is a defective pixel or not. On the contrary, when a pixel is in a dark area, it needs only a smaller difference to determine whether the pixel is a defective pixel or not.

The first comparator 520, which is connected to the third subtractor 430 and the lookup table 510, compares the third chroma signal U''' with the threshold. When the third chroma signal U''' is greater than the threshold, the first comparator 520 produces a first indicative signal 540, which indicates that the pixel (i, j) is a defective pixel, and directs the red signal of the pixel (i, j) to be corrected.

The second comparator 530, which is connected to the fourth subtractor 460 and the lookup table 510, compares the fourth chroma signal V''' with the threshold. When the fourth chroma signal V''' is greater than the threshold, the second comparator 530 produces a second indicative signal 550, which indicates that the pixel (i, j) is a defective pixel, and directs the blue signal of the pixel (i, j) to be corrected.

The defective pixel corrector 140, which is connected to the defective pixel detector 130 and the interpolator 110, computes edge features of the pixel and neighboring pixels in accordance with the first indicative signal 540 or second indicative signal 550. The defective pixel corrector 140 further selects pixel values from the neighboring pixels in accordance with the edge features for a correction of the defective pixel.

Figure 7:
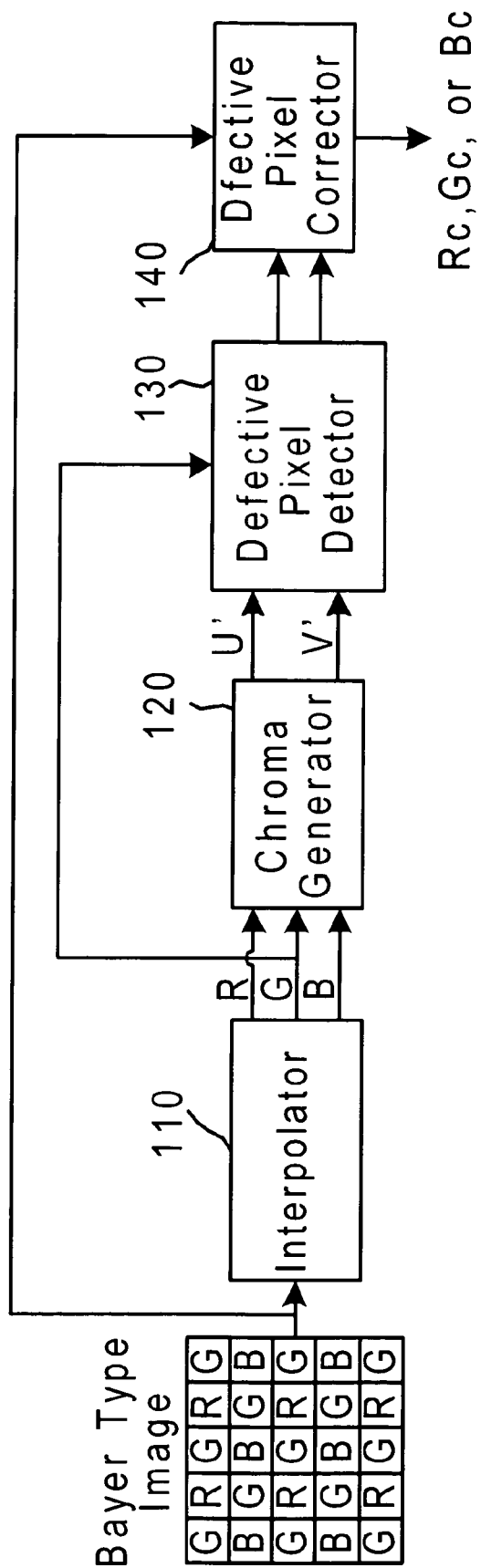
FIG. 7 is a block diagram of another embodiment in accordance with the invention.

FIG. 7 is a block diagram of another embodiment in accordance with the invention. As compared to FIG. 1, the defective pixel corrector 140 in FIG. 7 receives a pixel (i, j) and neighboring pixels of a Bayer digital image, computes the edge features of the pixels in accordance with the outputs of the defective pixel detector 130, and selects pixel values from the neighboring pixels in accordance with the edge features for performing a correction on a defective pixel when the pixel (i, j) is determined as the defective pixel.

The invention detects one or more defective pixels on the chroma domain in real-time, which uses an interpolation to reconstruct red, green and blue colors corresponding to each pixel of a Bayer type image captured by the image sensor, converts an image with the red, green and blue colors into a chroma domain, and performs a defective pixel detection on the image in the chroma domain. Finally, the invention uses the values of the neighboring pixels to correct the detected defective pixels. The corrective system for defective pixels of a color image first converts the color image from the RGB domain to the chroma domain and then performs the defective pixel detection. Because the defective pixel detection performed in the chroma domain is easier than that in the RGB domain, a defective pixel can be distinct from the chroma domain easier than from the RGB domain. Thus, it can accurately determine whether or not a pixel to be processed is defective.

Therefore, the invention can avoid the prior problem of using the defect map to record the defective pixels and further overcome the prior problem that the defective pixels cannot be detected effectively on a Bayer image.

Although the present invention has been explained in relation to its preferred embodiment, it is to be understood that many other possible modifications and variations can be made without departing from the spirit and scope of the invention as hereinafter claimed.

What is claimed is:

1. A method for correcting defective pixels of a color image in a color image processing system, which detects and corrects defective pixels of a digital image, the method comprising the steps of:

using a processor to perform the following steps:
(A) receiving a pixel and its neighboring pixels of the digital image;
(B) interpolating the pixel with red, green and blue colors;
(C) producing a first chroma signal and a second chroma signal based on the red, green and blue colors of the pixel interpolated;
(D) performing a filtering process on the first chroma signal and the second chroma signal to thus produce a third chroma signal and a fourth chroma signal;
(E) determining the pixel as a defective pixel when the third or fourth chroma signal is smaller than a threshold; and
(F) computing edge features of the pixel and neighboring pixels, and selecting pixel values from the neighboring pixels in accordance with the edge features for a correction operation of the defective pixel.

2. The method as claimed in claim 1, wherein the first chroma signal is obtained by subtracting the green color of the pixel interpolated from the red color of the pixel interpolated.

3. The method as claimed in claim 1, wherein the second chroma signal in the step (C) is obtained by subtracting the green color of the pixel interpolated from the blue color of the pixel interpolated.

4. The method as claimed in claim 1, wherein the filtering process in the step (D) performs a median filtering process on the first chroma signal.

5. The method as claimed in claim 4, wherein the filtering process in the step (D) performs a low pass filtering process on a signal produced after the median filtering process to accordingly produce a fifth chroma signal, and then subtracts the fifth chroma signal from the first chroma signal to thus produce the third chroma signal.

6. The method as claimed in claim 1, wherein the filtering process in the step (D) performs a median filtering process on the second chroma signal.

7. The method as claimed in claim 6, wherein the filtering process in the step (D) performs a low pass filtering process on a signal produced after the median filtering process to accordingly produce a sixth chroma signal, and then subtracts the sixth chroma signal from the second chroma signal to thus produce the fourth chroma signal.

8. The method as claimed in claim 1, wherein the threshold in the step (D) is determined in accordance with a value of the green color of the pixel interpolated.

9. A system for correcting defective pixels of a color image, which detects and corrects defective pixels of a digital image, the system comprising:

an interpolator, which receives a pixel and its neighboring pixels of the digital image and interpolates the pixel with red, green and blue colors;
a chroma generator, which is connected to the interpolator, produces a first chroma signal and a second chroma signal based on the red, green and blue colors of the pixel interpolated;
a defective pixel detector, which is connected to the chroma generator, filters the first chroma signal and the second chroma signal and produce a third chroma signal and a fourth chroma signal to thus produce a defective signal, which indicates the pixel received as a defective pixel, when the third chroma signal or fourth chroma signal is smaller than a threshold; and
a defective pixel corrector, which is connected to the defective pixel detector, computes edge features of the pixel and neighboring pixels in accordance with the defective signal, and selects pixel values from the neighboring pixels in accordance with the edge features for a correction of the defective pixel.

10. The system as claimed in claim 9, wherein the chroma generator further comprises a first subtractor to produce the first chroma signal by subtracting a value of the green color of the pixel interpolated from a value of the red color of the pixel interpolated.

11. The system as claimed in claim 9, wherein the chroma generator further comprises a second subtractor to produce the second chroma signal by subtracting the green color of the pixel interpolated from the blue color of the pixel interpolated.

12. The system as claimed in claim 9, wherein the defective pixel detector further comprises:

a first median filter, which performs a first median filtering process on the first chroma signal;
a first low pass filter, which is connected to the first median filter in order to perform a low pass filtering process on a signal produced by the first median filter to accordingly produce a fifth chroma signal; and
a third subtractor, which is connected to the first low pass filter in order to subtract the fifth chroma signal from the first chroma signal to thus produce the third chroma signal.

13. The system as claimed in claim 12, wherein the defective pixel detector further comprises:

a second median filter, which performs a second median filtering process on the second chroma signal;
a second low pass filter, which is connected to the second median filter performs a low pass filtering process on a signal produced by the second median filter to accordingly produce a sixth chroma signal; and
a fourth subtractor, which is connected to the second low pass filter subtracts the sixth chroma signal from the second chroma signal to thus produce the fourth chroma signal.

14. The system as claimed in claim 13, wherein the defective pixel detector further comprises:

a lookup table, which is connected to the interpolator, produces the threshold in accordance with a value of the green color of the pixel interpolated,
a first comparator, which is connected to the third subtractor and the lookup table, compares the third chroma signal with the threshold and produces the defective signal when the third chroma signal is greater than the threshold; and
a second comparator, which is connected to the fourth subtractor and the lookup table, compares the fourth chroma signal with the threshold and produces the defective signal when the fourth chroma signal is greater than the threshold.

15. The system as claimed in claim 9, wherein the defective pixel corrector, which is connected to the defective pixel detector and the interpolator, for computing edge features of the pixel and neighboring pixels which is outputted from the interpolator in accordance with the defective signal, and selecting pixel values from the neighboring pixels for a correction of the defective pixel in accordance with the edge features.

16. A system for correcting defective pixels of a color image, which detects and corrects defective pixels of a digital image, the system comprising:

an interpolator, which receives a pixel and its neighboring pixels of the digital image and interpolates the pixel with red, green and blue colors;

a chroma generator, which is connected to the interpolator, for producing a first chroma signal and a second chroma signal based on the red, green and blue colors of the pixel interpolated;

a defective pixel detector, which is connected to the chroma generator, for filtering the first chroma signal and the second chroma signal and producing a third chroma signal and a fourth chroma signal to thus produce a defective signal, which indicates the pixel received as a defective pixel, when the third chroma signal or fourth chroma signal is smaller than a threshold; and a defective pixel corrector, which receives the pixel and neighboring pixels and is connected to the defective pixel detector, for computing edge features of the pixel and neighboring pixels in accordance with the defective signal, and selecting pixel values from the neighboring pixels for a correction of the defective pixel in accordance with the edge features.

* * * * *